United States Patent
Weyand et al.

(10) Patent No.: US 6,829,943 B2
(45) Date of Patent: Dec. 14, 2004

(54) VEHICLE WEIGHT OBSERVATION SYSTEM

(75) Inventors: Wolfgang Weyand, Overath (DE); Wolfgang Wickler, Bruehl (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,766

(22) Filed: Feb. 14, 2003

(65) Prior Publication Data

US 2003/0154798 A1 Aug. 21, 2003

(30) Foreign Application Priority Data

Feb. 15, 2002 (EP) .............................. 02100140

(51) Int. Cl.$^7$ .............................. G01N 3/00; G01D 1/00; G01L 1/00
(52) U.S. Cl. ................. 73/760; 73/862.381; 73/862.53; 340/667
(58) Field of Search ........................... 73/760, 862.381, 73/862.51, 862.52, 862.53; 340/667, 666, 665

(56) References Cited

U.S. PATENT DOCUMENTS

| | | | | |
|---|---|---|---|---|
| 4,605,081 A | * | 8/1986 | Helmly et al. ........... 177/25.13 |
| 5,161,628 A | | 11/1992 | Wirth | |
| 5,173,866 A | * | 12/1992 | Neumann et al. ........... 702/188 |
| 5,438,881 A | | 8/1995 | Engles et al. | |
| 5,644,489 A | * | 7/1997 | Hagenbuch .............. 455/456.1 |
| 5,646,376 A | * | 7/1997 | Kroll et al. ................ 177/211 |
| 5,740,048 A | * | 4/1998 | Abel et al. ................. 701/200 |
| 5,805,055 A | * | 9/1998 | Colizza ................. 340/426.25 |
| 5,817,989 A | * | 10/1998 | Shimizu et al. ............. 177/136 |
| 5,831,343 A | * | 11/1998 | Nakazaki ................. 307/10.1 |
| 5,878,376 A | * | 3/1999 | Schurr ........................ 702/102 |
| 5,898,135 A | * | 4/1999 | Nakazaki ..................... 177/136 |
| 6,059,062 A | * | 5/2000 | Staelin et al. ............... 180/181 |
| 6,157,889 A | * | 12/2000 | Baker ......................... 701/124 |
| 6,484,080 B2 | * | 11/2002 | Breed ......................... 701/36 |
| 6,650,987 B2 | * | 11/2003 | Kogure et al. ................ 701/80 |
| 2002/0059075 A1 | * | 5/2002 | Schick et al. .................. 705/1 |

FOREIGN PATENT DOCUMENTS

| | | | |
|---|---|---|---|
| DE | 43-00-677 A | 7/1994 | |
| EP | 0-769-402 A | 4/1997 | |
| JP | 04052544 A * | 2/1992 | .......... G01M/17/02 |
| WO | WO 87-02127 | 4/1987 | |
| WO | WO 93-09510 A | 5/1993 | |

* cited by examiner

*Primary Examiner*—Max Noori
*Assistant Examiner*—Lilybett Martir

(57) ABSTRACT

The invention relates to a weight monitoring system for a motor vehicle (1) which can, if appropriate, be connected to a trailer (2). The system uses weight sensors to determine the weights ($F_1$, $F_2$) acting on the axles of the motor vehicle, in order to calculate from them the overall weight of the vehicle, and the axle loads. In addition, a tractive force sensor may be provided in the trailer hitch so that the mass of the trailer (2) can be determined by means of the tractive force ($F_3$) and the acceleration of the vehicle. The weight monitoring system calculates various weight variables from the measured values and monitors to determine whether they remain within defined limits. In this context, it is possible, in particular, to take into account a planned route in such a way that the limiting values of the charge are adapted with respect to the maximum altitude ($H_{max}$) above sea level and/or the maximum gradient ($s_{max}$) of the route. In addition, the system can be configured in such a way that it provides the driver with proposals for a different distribution of the payload which leads to a permissible axle load.

18 Claims, 1 Drawing Sheet

VEHICLE WEIGHT OBSERVATION SYSTEM

BACKGROUND OF INVENTION

1. Technical Field

The present invention relates generally to a system for monitoring the weight of a motor vehicle.

2. Background of the Invention

When a motor vehicle is used, it is necessary, for technical reasons, to comply with maximum values for the overall weight of the vehicle and for the axle load which bears on each individual axle. The overall weight of the vehicle is composed of the maximum empty weight (pure weight of the vehicle plus 90% charge in the fuel tank plus maximum charge with other fluids) as well as the payload (driver, other occupants of the vehicle, baggage). If the motor vehicle has a trailer hitch and is towing a trailer, there exists a maximum overall weight of the vehicle combination, composed of the already mentioned overall weight of the vehicle and the weight of the trailer, with which to comply, the weight of the trailer giving rise in turn to a maximum vertical static load on the trailer hitch and to a maximum towable load. Although the maximum values for the aforesaid weights are recorded in the vehicle's user manual, in practice only a small number of users are aware of the precise significance of these parameters, and a correspondingly small number of users pay attention to them when loading their vehicle. It is therefore frequently the case that the permitted maximum values are exceeded and a vehicle is overloaded. As a result, it is possible that the dynamics of the vehicle may be degraded, giving rise to an insufficient cooling capacity of the various cooling systems, especially if the air conditioning system is used, and inadequate acceleration characteristics when the vehicle travels at positive gradients.

WO 87/02127 discloses a weight monitoring system that has at least one sensor for sensing the loading of an axle with weight. A microprocessor which is coupled to the sensor then calculates weight-related parameters such as the axle load, the overall weight of the vehicle and the payload from the measured data of the sensor and makes the aforesaid parameters available to a user on a display in a callable form. If the microprocessor detects that a legally permitted weight limit is exceeded, it issues a warning to the user. Such a weight monitoring system can prevent many cases of impermissible overloading of the vehicle without the user himself having to make complicated calculations in this respect. Nevertheless, such a system has considerable gaps owing to the fact that a user who is forced to transport a certain payload will possibly exceed the limiting values to do so, and as the system only takes into account the conditions which prevail at the respective time but can, however, change in the course of a journey.

It would therefore be desirable to provide a weight monitoring system for a vehicle that provides better protection against overloading of the motor vehicle without burdening the user with complicated calculations.

SUMMARY OF INVENTION

The present invention provides a system for monitoring the weight of a motor vehicle.

In one aspect of the invention, a weight monitoring system of a motor vehicle is disclosed. This system comprises at least one weight sensor, which is capable of sensing at least one weight variable. The system further comprises a data processing unit operatively coupled with the at least one weight sensor, wherein the data processing unit is capable of calculating a maximum value for the at least one weight variable based on at least one anticipated operating condition.

One advantage of the invention is that it provides better protection against a user overloading a vehicle for a specified set of operating conditions. Another advantage of the invention is that it allows the user to check whether a payload will comply with the maximum load values before actually loading the vehicle.

Other advantages and features of the present invention will become apparent when viewed in light of the detailed description of the preferred embodiment when taken in conjunction with the attached drawing and appended claims.

DETAILED DESCRIPTION

Figure 2:
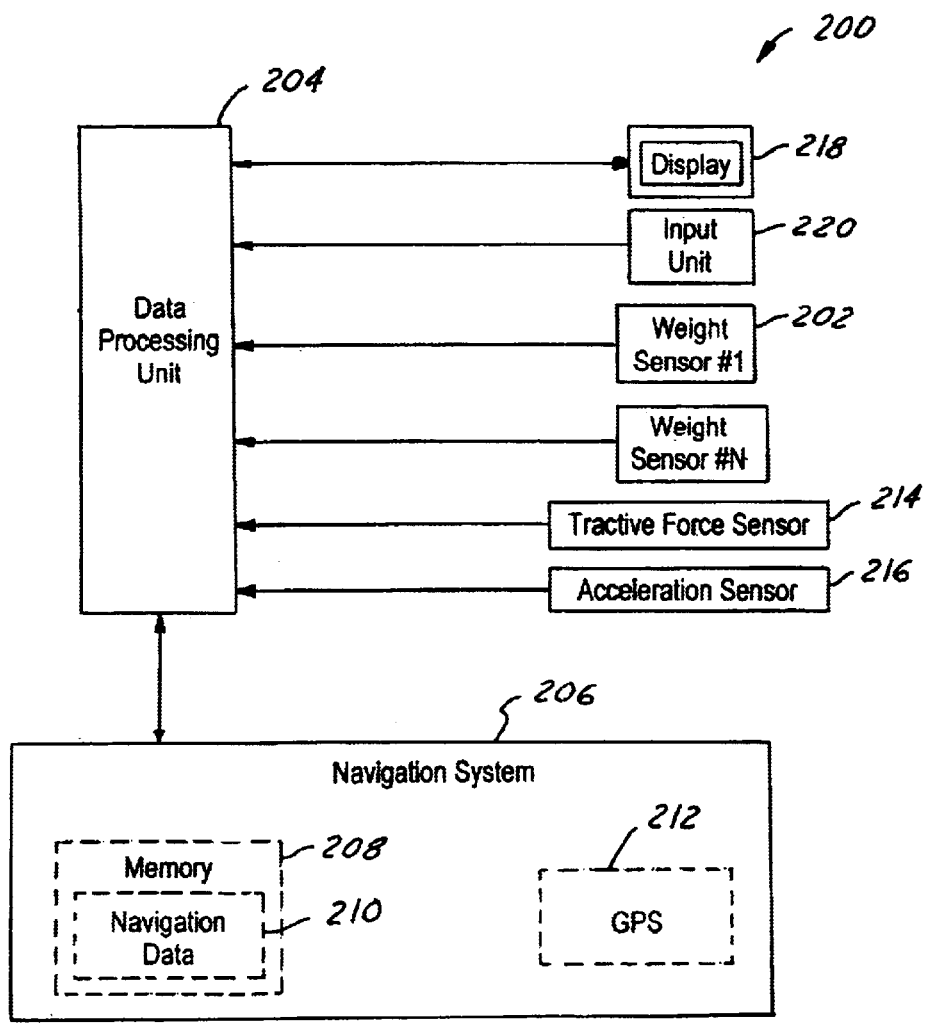
FIG. 2 is a is a diagram of a vehicle weight observation system according to an embodiment of the present invention.

Referring to FIG. 2, the weight monitoring system 200 according to the invention contains at least one sensor for a weight variable 202 and one data processing unit 204 which is coupled to the sensor. The weight variable may be, in particular, the overall weight of the motor vehicle, the payload of the motor vehicle, the entire weight of the vehicle and trailer combination (motor vehicle and trailer), the weight of the trailer, the vertical loading of the trailer hitch and/or an axle load. In an embodiment of the invention, the weight monitoring system is distinguished by the fact that the data processing unit is designed to calculate the maximum permissible value of the weight variable for a planned route in accordance with a programmed specification, and to monitor compliance with said value.

The aforesaid specification may be programmed into the system in particular by the manufacturer of the vehicle in accordance with the specifications for maximum payload and the like which are recorded in the vehicle's user manual. However, if desired, the programming of the specification into the system can also be carried out by a competent user himself. It is important that the data processing unit should take into account the planned route of the motor vehicle when monitoring the weight variable. Ambient conditions which have an influence on the maximum permissible value of the weight variable or on the weight variable itself may in fact vary along this route. At the start of the journey, the data processing unit can therefore calculate that maximum value of the weight variable which guarantees compliance with the predefined limiting values for the anticipated operating conditions. This considerably increases the safety of the system particularly over long journeys, for example when going on holiday. In particular, a situation is avoided in which it only suddenly becomes clear in the middle of the journey, without the possibility of change, that the load which was permissible at the start of the journey causes impermissible limiting values to be exceeded in another environment.

One example of an anticipated operating condition that may limit the value of a weight variable along a route are various legal prescriptions in various states. However, variable physical or technical peripheral conditions, including in particular the positive gradient or the negative gradient of the road and the height of the road above sea level, are also particularly important. According to one preferred embodiment, the weight monitoring system has a navigation system 206, including a memory 208 with stored navigation data 210, the navigation data comprising the positive gradient and/or height above the sea level of various routes. By resorting to this memory it is then possible for the data processing unit to ensure, for a planned route, that the motor vehicle with the selected load can overcome all the positive gradients which occur, and that it has sufficient engine power at all the heights above sea level. Said engine power in fact drops as a function of the height at which the vehicle is located owing to the decreasing air pressure.

In a further embodiment of the invention it is possible to determine the current location of the vehicle by means of Global Positioning System (GPS) 212 and to determine the current location-dependent limiting value for the vehicle by means of a reconciliation with the memory of the data processing unit. This can include both the height above sea level and the positive gradient.

According to another embodiment of the weight monitoring system having at least one sensor for a weight variable and a data processing unit which is coupled thereto, the data processing unit is designed to calculate optimum values for at least one vehicle parameter which is dependent on the weight variable. The calculated value can then be displayed to the user so that the latter can set the vehicle parameter appropriately, or the data processing unit can itself bring about the automatic setting of the vehicle parameter to the optimum value by actuating suitable actuators. Examples of vehicle parameters which are dependent on a weight variable are, for example, the tire pressure or the angle of inclination of the headlights. The optimum setting of such variables is in practice frequently not carried out by the user as he generally does not know about the necessity to adapt the variables, nor is he in the position to determine optimum settings for them.

According to another embodiment of the weight monitoring system having at least one sensor for a weight variable and a data processing unit coupled thereto, the data processing unit is designed to calculate proposals for a change in the current or planned load of the vehicle such that the maximum permissible value of the weight variable in accordance with a programmed specification is complied with. The weight monitoring system is accordingly not limited only to determining whether predefined limiting values are exceeded or to warning the user of this but rather also determines structural proposals for changing the load, after the execution of which the permitted limits are complied with again. In particular, it is possible here to propose a different distribution of the payload in the vehicle if there is an impermissible distribution of the axle loads (and the permissible overall weight is complied with). The proposals of the weight monitoring system support the user in utilizing the transportation capacity of his vehicle to an optimum degree.

The weight monitoring system can in particular contain sensors which determine the weight acting on each individual wheel. Both the overall weight and the respective axle load can then be determined from this information. The sensors may be in particular pressure sensors in a pneumatic or hydraulic suspension system for the bodywork and/or distance sensors in conventional spring/damper suspension systems. The data processing unit should preferably provide the possibility of allowing the user himself to determine which value is considered to be the starting value before the vehicle is loaded. For example, the user could define a current weight of the vehicle as a starting weight by pushing a pushbutton. As soon as the vehicle is loaded, the difference between the axle loads can be determined from the sensor signals. If an impermissible distribution of the axle loads becomes apparent here, the system can, as explained above, provide the user with proposals for a different distribution of the loads in the front/rear seat/trunk regions.

According to another development of the weight monitoring system, the latter contains a tractive force sensor 214 arranged in the trailer hitch of the motor vehicle and an acceleration sensor 216, the data processing unit being coupled to the aforesaid sensors and being configured in such a way that the weight of the trailer is calculated from the tractive force measured by the tractive force sensor, and from the acceleration of the motor vehicle measured by the acceleration sensor. As the tractive force acting on the trailer is the product of the mass of the trailer and the current acceleration, it is possible to determine the unknown third variable, in the present case the mass of the trailer, from the knowledge of two of these variables. With the proposed arrangement it is advantageous that sensors have to be provided only in the motor vehicle itself but not in the trailer. The weight monitoring system can therefore be coupled to any desired trailer and permit the weight of the trailer to be taken into account precisely in the determination of current and permissible weight values.

The weight monitoring system preferably contains a display device 218, for example a liquid crystal display, for presenting information to a user. The information for the user can include, in particular, the measured weight variables or proposals for a change in the load. Furthermore, the display device should permit warning messages to be displayed and/or audible warnings to be issued so that the user can be informed when it is detected that the permissible weight limits have been exceeded.

Furthermore, the data processing unit can be coupled to an input unit 220, for example a keypad, via which the user may input, for example, a planned route or a planned load of the vehicle. The inputting of a planned route can be used by the system to calculate the permissible load over the entire profile of the route. By inputting a planned load and correspondingly configuring the data processing unit it is also possible to ensure that the weight monitoring system checks the permissibility of a planned load and informs the user when weight values are possibly exceeded, or provides proposals for change. The user can thus have a specific route and/or load checked in advance to determine whether it can be executed, without being obliged to first actually implement the load on the vehicle and then correct it if appropriate.

The invention is explained in more detail below with reference to FIG. 1 and by means of examples.

Figure 1:
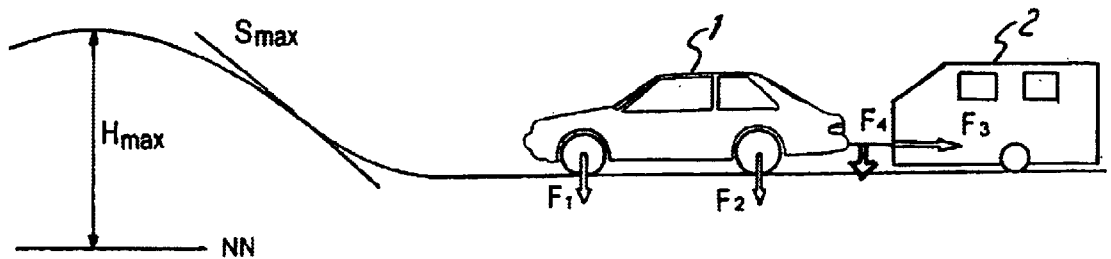
FIG. 1 is a schematic view of a motor vehicle having the weight monitoring system according to the invention.

Referring to FIG. 1, the weight monitoring system located in the motor vehicle 1 comprises, as data processing unit, a microcomputer (not illustrated) which receives measurement signals from force sensors (not illustrated) at the wheels and at a trailer hitch. The force sensors measure here the weight $F_1$ acting on the front axle or the wheels of the front axle, the weight $F_2$ acting on the rear axle or the wheels of the rear axle, and the tractive force $F_3$ which acts on the trailer hitch and is exerted on a trailer 2. The microcomputer is programmed in such a way that it can calculate the overall weight of the motor vehicle 1 from the forces $F_1$ and $F_2$. In addition, the empty weight of the motor vehicle is stored in a memory of the microcomputer (for example by the manufacturer or by inputting by the user), so that the microcomputer can calculate the payload located in the motor vehicle 1 from the difference between the overall weight and the empty weight. Furthermore, the forces $F_1$ and $F_2$ indirectly specify the distribution of the weight among the two axles.

If, as in the case illustrated, a vehicle-trailer combination, composed of the motor vehicle 1 and a trailer 2 which is coupled thereto, is present, the weight monitoring system also requires knowledge of the mass of the trailer 2. This is measured from the motor vehicle in the example illustrated by measuring the tractive force $F_3$ exerted on the trailer 2, and at the same time the change in speed (acceleration) during a journey using an acceleration meter (not illustrated) in the motor vehicle 1.

Furthermore, a force sensor for the vertical statistical force load $F_4$ can be integrated in the trailer hitch. In summary, the following weights are to be distinguished in a vehicle-trailer combination:

Overall weight of the vehicle-trailer combination composed of trailer weight with static vertical loading towable weight overall vehicle weight composed of maximum empty weight (basic empty weight+maximum mass of fluid such as oil etc.+mass of 90% tank charge)

payload (driver, passengers, baggage, vertical trailing load).

In order to protect the vehicle and its components against overloading it is necessary for the motor vehicle to be loaded only up to predefined limiting values. Here, the average user is generally completely unable to check compliance with the maximum values for the weight variables defined above. According to the invention, the current values of all the relevant weight variables are therefore automatically determined by the weight monitoring system using the sensors already mentioned, and compared with the predefined limiting values. If the weight monitoring system detects that a limiting value is exceeded, it informs the user of this by means of a visual and/or audible display device (not illustrated). Here, the system can in particular also make proposals for a change in the load which returns the load to the permissible range. This applies in particular in the cases in which there is an unfavorable axle load which could be corrected by a different distribution of the payload.

Furthermore, the weight monitoring system is preferably configured in such a way that it can also process planned loads which have been input by the user and check whether they are permissible. The user can therefore plan the load in advance, which prevents unpleasant surprises during the actual loading process.

The figure also contains a schematic illustration of the altitude profile of a planned route. Here, in particular heights above sea level (NN) and positive inclines during the course of the route are of interest for the purposes of monitoring the weight. Height above sea level acts in fact on the efficiency of the engine as a result of the reduced air pressure, while the positive gradient of the route determines the tractive power required by the motor vehicle 1. The weight monitoring system according to the invention is therefore configured in such a way that the user can input his destination or the planned route by means of an interface or input device. For this purpose, the weight monitoring system is preferably linked to a navigation system. The weight monitoring system then uses stored or interrogated data to determine the heights above sea level NN reached during the planned route, in particular the maximum height $H_{max}$, and the positive gradients, in particular the maximum gradient $s_{max}$. These two variables determine the maximum values for various weight variables by means of known functional relationships or stored tables, so that the weight monitoring system can base its operations on values which permit permissible limits to be complied with over the entire route. This avoids a situation in which, when starting a relatively long journey, the weight monitoring system bases its operations on conditions which change considerably in the course of the journey, thus possibly leading to permissible weight limits being exceeded by the current load.

The significance of taking into account a planned route is illustrated below by means of two examples.

EXAMPLE 1

The type of motor vehicle considered is a five-door Ford Mondeo with automatic transmission and 2.0 l4 engine with 106 kW (145 HP). In addition, it is assumed that a family (two adults: 150 kg; two children: 100 kg) are planning to go on holiday in Italy departing from Cologne taking their trailer with them. At the same time, they are to transport two surfboards with sails (60 kg) on the roof as well as baggage for four persons (total of 100 kg). Possible routes are the Brenner motorway or the Groβ glockner route.

Taking these specifications as a basis, the following questions arise:

a) how large is the permitted payload and the actual payload of the vehicle?

b) how large is the permissible trailer weight with the actual payload for the two routes under consideration?

Regarding a): The empty weight of the vehicle which is recorded in the user manual of the vehicle and programmed into the weight monitoring system is known and is 1476 kg. The maximum overall weight of the vehicle is predefined as 1910 kg. The permitted payload is therefore 1910 kg–1476 kg=434 kg.

The actual payload is (150 kg+100 kg+100 kg+60 kg)= 410 kg.

Regarding b): On the basis of the actual payload and the empty weight the actual overall weight of the vehicle is calculated as (410 kg+1476 kg)=1886 kg.

The maximum trailer weight can be obtained from the user manual of the vehicle or is stored in the weight monitoring system and is 1800 kg. The maximum overall weight of the vehicle-trailer combination (motor vehicle+ trailer) is also known and is 3460 kg. The theoretical maximum of the trailer weight with the maximum overall vehicle weight is therefore (3460 kg–1910 kg)=1550 kg.

First Alternative—"Brenner motorway": The maximum height along the Brenner motorway is obtained from corresponding data bases and is 1376 m above sea level. According to the specifications of the vehicle manufacturer, 10% of the maximum permissible overall weight of the vehicle-trailer combination is to be deducted for each commenced 1000 m interval above 1000 m above sea level. In the present case this leads to a maximum overall weight of the vehicle-driver combination of (3460 kg·0.9)=3114 kg. The maximum permissible trailer weight can therefore be calculated as follows:

3114 kg–1886 kg (actual overall vehicle weight)=1228 kg.

Second Alternative—"Groβ glockner route": The maximum height above sea level is 2300 m, so that applying the "10% rule" a maximum overall weight of the vehicle-trailer combination of (3460 kg·0.8)=2768 kg is obtained. The maximum permissible trailer weight can therefore be calculated as follows:

2768 kg–1886 kg (actual overall vehicle weight)=882 kg.

The above calculations apply under the proviso that the maximum positive gradient on the routes is less than 12%. In order to make the calculations more precise, it is additionally possible to take into account the actual maximum positive gradient on the routes.

This example shows that the family would have used a trailer which is approximately 1000 kg too heavy if they had based its calculations only on the maximum permissible trailer weight of 1800 kg specified in the user manual of the vehicle and had selected the Gro B glockner route. It is clear that this would have overloaded the vehicle.

EXAMPLE 2

The vehicle type used for the considerations was again a five-door Ford Mondeo with automatic transmission and 2.0 l4 engine with 106 kW (145 HP). A person (85 kg) living in Austria at 1300 m above sea level was intending to drive, using a trailer, to a builder's merchants and from there carry as many 40 kg bags of cement with him as possible. A trailer without an active brake and a trailer with an active brake are alternatively available to him. Taking these specifications as a basis, the following questions arise:

a) how many bags of cement can be loaded into the vehicle?

b) how many bags of cement can be loaded into the trailer?

Regarding a): The empty weight of the vehicle which is recorded in the user manual of the vehicle and programmed into the weight monitoring system is known and is 1476 kg. The maximum overall weight of the motor vehicle is also predefined as 1910 kg. The permitted payload is therefore 1910 kg–1476 kg=434 kg.

The permitted axle loads can also be looked up in the vehicle's user manual or are stored in the weight monitoring system and are 985 kg for the front axle and the rear axle, respectively. In the same way, the value 75 kg is known for the maximum vertical load of the trailer coupling.

The weight monitoring system according to the invention makes it possible for the driver to detect when a maximum axle load is exceeded. This would not be possible without measuring the actual forces on the axles.

The maximum possible cement payload is:

$$434 \text{ kg} - 85 \text{ kg (driver)} = 349 \text{ kg}.$$

A maximum of eight bags of cement with a total weight of 320 kg can therefore be loaded into the vehicle. However, there is a considerable risk here of the driver exceeding the permissible axle load on the rear axle. The only way for him to prevent this is to use the weight monitoring system according to the invention and monitor the axle loads separately.

Regarding b): The actual payload resulting from the above calculations is (320 kg+85 kg)=405 kg. The actual overall weight of the vehicle therefore has the value (405 kg+1476 kg)=1881 kg.

The maximum trailer weight can be looked up in the vehicle's user manual or is stored in the weight monitoring system and is 1800 kg. The maximum overall weight of the vehicle-trailer combination (motor vehicle+trailer) is also known and is 3460 kg. The theoretical maximum trailer weight with a maximum overall vehicle weight is therefore (3460 kg–1910 kg=1550 kg. However, as the person is living at more than 1000 m above sea level, 10% of the maximum permitted overall weight of the vehicle-trailer combination is to be deducted, which leads to a value of 3114 kg.

First Alternative—"Trailer without active brake": The empty weight of the trailer would be 200 kg. The maximum trailer weight for trailers without an active brake can be obtained from the vehicle's user manual or is stored in the weight monitoring system and is 710 kg. Parallel to this, the maximum trailer weight must be calculated from the maximum permissible overall weight of the vehicle-trailer combination and the actual weight of the vehicle: (3114 kg–1881 kg)=1233 kg. The smaller of these two weight values then constitutes the value of the maximum trailer weight which is to be complied with so that in this case it is 710 kg.

The maximum permissible payload of the trailer is thus obtained as (710 kg–200 kg)=510 kg, which corresponds to a maximum load of the trailer with 12 bags of cement (480 kg).

Second Alternative—"Trailer with active brake": The empty weight of the trailer would be 350 kg. The maximum trailer weight for trailers with an active brake can be obtained from the vehicle's user manual or is stored in the weight monitoring system and is 1800 kg. In parallel with this, the maximum trailer weight must in turn be calculated from the maximum possible overall weight of the vehicle-trailer combination and the actual weight of the vehicle: (3114 kg–1881 kg)=1233 kg. The smaller of these two weight values then constitutes the value of the maximum trailer weight which is to be complied with so that in this case this is 1233 kg.

The maximum permissible payload of the trailer is thus obtained as (1233 kg–350 kg)=883 kg, which corresponds to a maximum load of the trailer with 22 bags of cement (880 kg).

The above calculations apply under the condition that the maximum positive gradient on the route is less than 12%. If the driver had followed only the theoretical maximum overall weight of the trailer with an active brake system he would have overloaded the trailer by approximately 570 kg.

While particular embodiments of the invention have been shown and described, numerous variations and alternate embodiments will occur to those skilled in the art. Accordingly, it is intended that the invention be limited only in terms of the appended claims.

What is claimed is:

1. A weight monitoring system of a motor vehicle, comprising:
    at least one weight sensor, wherein said at least one weight sensor senses at least one weight variable related to the overall weight of a motor vehicle; and
    a data processing unit, said data processing unit being operatively coupled with said at least one weight sensor, wherein said data processing unit determines a maximum value for said at least one weight variable based on at least one anticipated operating condition of a planned travel route for the motor vehicle;
    wherein said data processing unit compares said at least one weight variable to said maximum value;
    wherein said data processing unit generates an alert when said at least one weight variable exceeds said maximum value.

2. The system of claim 1, further comprising a display device, wherein said alert comprises a visual presentation displayed on said display device.

3. The system of claim 2, wherein said display device comprises a liquid crystal display.

4. The system of claim 1, wherein said data processing unit monitors said at least one weight variable.

5. A weight monitoring system of a motor vehicle, comprising:
    at least one weight sensor, wherein said at least one weight sensor senses at least one weight variable related to the overall weight of a motor vehicle; and
    a data processing unit, said data processing unit being operatively coupled with said at least one weight sensor, wherein said data processing unit determines a maximum value for said at least one weight variable based on at least one anticipated operating condition of a planned travel route for the motor vehicle;
    wherein said at least one anticipated operating condition comprises a maximum height above sea level for the planned motor vehicle travel route.

6. The system of claim 5, wherein said data processing unit compares said at least one weight variable to said maximum value.

7. A weight monitoring system of a motor vehicle, comprising:
- at least one weight sensor, wherein said at least one weight sensor senses at least one weight variable related to the overall weight of a motor vehicle; and
- a data processing unit, said data processing unit being operatively coupled with said at least one weight sensor, wherein said data processing unit determines a maximum value for said at least one weight variable based on at least one anticipated operating condition of a planned travel route for the motor vehicle;
- wherein said at least one anticipated operating condition comprises a maximum gradient for the planned motor vehicle travel route.

8. The system of claim 7, further comprising a navigation system operatively coupled with said data processing unit, said navigation system comprising a memory, a set of navigation data stored in said memory, and a Global Positioning System (GPS) unit, wherein said at least one anticipated operating condition is determined by said navigation system.

9. The system of claim 7, wherein said data processing unit determines a loading plan for said motor vehicle.

10. A weight monitoring system of a motor vehicle, comprising:
- at least one weight sensor, wherein said at least one weight sensor senses at least one weight variable related to the overall weight of a motor vehicle; and
- a data processing unit, said data processing unit being operatively coupled with said at least one weight sensor, wherein said data processing unit determines maximum value for said at least one weight variable based on at least one anticipated operating condition of a planned travel route for the motor vehicle;
- a tractive force sensor, said tractive force sensor implemented such that said tractive force sensor determines a tractive force exerted on a trailer when said trailer is towed by said motor vehicle, and an acceleration sensor, said acceleration sensor implemented such that said acceleration sensor determines an acceleration measurement of said motor vehicle, said tractive force sensor and said acceleration sensor being operatively coupled to said data processing unit, wherein said data processing unit determines a trailer mass of said trailer based on said tractive force and said acceleration measurement.

11. The system of claim 10, wherein said data processing unit compares said trailer mass of said trailer to a maximum trailer mass value, said maximum trailer mass value being determined by said data processing unit based on said at least one anticipated operating condition.

12. A weight monitoring system of a motor vehicle, comprising:
- at least one weight sensor, wherein said at least one weight sensor senses at least one weight variable related to the overall weight of a motor vehicle; and
- a data processing unit, said data processing unit being operatively coupled with said at least one weight sensor, wherein said data processing unit determines a maximum value for said at least one weight variable based on at least one anticipated operating condition of a planned travel route for the motor vehicle;
- wherein said at least one anticipated operating condition comprises a maximum height above sea level and a maximum gradient for the planned motor vehicle travel route.

13. The system of claim 12, wherein said data processing unit adjusts a motor vehicle parameter based on said at least one weight variable.

14. The system of claim 12, further comprising a user input unit, said user input unit being operatively coupled with the data processing unit.

15. The system of claim 12, wherein said data processing unit compares said at least one weight variable from said at least one weight sensor to said maximum value and determines when said at least one weight variable exceeds said maximum value for said planned travel route for said motor vehicle.

16. A weight monitoring system of a motor vehicle, comprising:
- at least one weight sensor, wherein said at least one weight sensor senses at least one weight variable related to the overall weight of at least one of a motor vehicle and trailer; and
- a data processing unit, said data processing unit being operatively coupled with said at least one weight sensor, wherein said data processing unit determines a maximum value for said at least one weight variable based on at least one anticipated operating condition of a planned travel route for the motor vehicle;
- wherein said at least one anticipated operating condition comprises a maximum height above sea level for the planned motor vehicle travel route.

17. The system of claim 16, wherein said data processing unit compares said at least one weight variable from said at least one weight sensor to said maximum value and determines when said at least one weight variable exceeds said maximum value for said planned travel route for said motor vehicle.

18. A weight monitoring system of a motor vehicle, comprising:
- at least one weight sensor, wherein said at least one weight sensor senses at least one weight variable related to the overall weight of at least one of a motor vehicle and trailer; and
- a data processing unit, said data processing unit being operatively coupled with said at least one weight sensor, wherein said data processing unit determines a maximum value for said at least one weight variable based on at least one anticipated operating condition of a planned travel route for the motor vehicle;
- wherein said at least one anticipated operating condition comprises a maximum gradient for the planned motor vehicle travel route.

* * * * *